(12) United States Patent
Hyun

(10) Patent No.: US 7,750,907 B2
(45) Date of Patent: Jul. 6, 2010

(54) METHOD AND APPARATUS FOR GENERATING ON-SCREEN DISPLAY USING 3D GRAPHICS

(75) Inventor: Dae-eun Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 11/606,048

(22) Filed: Nov. 30, 2006

(65) Prior Publication Data
US 2007/0247455 A1    Oct. 25, 2007

(30) Foreign Application Priority Data
Apr. 21, 2006    (KR) ............. 10-2006-0036338

(51) Int. Cl.
*G06T 15/00*    (2006.01)

(52) U.S. Cl. ............... 345/427; 345/473; 345/590; 345/592

(58) Field of Classification Search ............. 345/427, 345/473, 474, 475, 590, 591, 592
See application file for complete search history.

(56) References Cited

U.S. PATENT DOCUMENTS

| | | | | |
|---|---|---|---|---|
| 6,160,907 A | * | 12/2000 | Robotham et al. | 382/154 |
| 6,377,255 B1 | * | 4/2002 | Ishikawa | 345/418 |
| 6,856,314 B2 | * | 2/2005 | Ng | 345/421 |
| 7,019,742 B2 | * | 3/2006 | Le Ouay | 345/419 |
| 7,423,650 B2 | * | 9/2008 | Lee et al. | 345/473 |

* cited by examiner

*Primary Examiner*—Phu Nguyen
(74) *Attorney, Agent, or Firm*—Sughrue Mion, PLLC (57) ABSTRACT

A method and a system are provided for generating an on-screen display using 3D graphics in devices without a high quality 3D graphics accelerator. 3D graphic images obtained from a 3D graphic image generator are mapped to 2D graphic images, and the mapped 2D graphic images are moved according to 2D motion vectors estimated from 3D motion of a 3D geometric object on a viewport. Accordingly, it is possible to generate and display a 3D graphic on-screen display.

18 Claims, 8 Drawing Sheets

METHOD AND APPARATUS FOR GENERATING ON-SCREEN DISPLAY USING 3D GRAPHICS

CROSS-REFERENCE TO RELATED PATENT APPLICATION

This application claims priority from Korean Patent Application No. 10-2006-0036338, filed on Apr. 21, 2006, in the Korean Intellectual Property Office, the disclosure of which is incorporated herein in its entirety by reference.

BACKGROUND OF THE INVENTION

1. Field of the Invention

Methods, apparatuses and systems consistent with the present invention relate to generating an on-screen display using 3D graphics, in devices without high quality 3D graphics accelerators (e.g., digital televisions and set top boxes).

2. Description of the Related Art

Digital televisions (DTVs) and set top boxes (STBs) use an on-screen display to deliver information such as channel and program information. In general, 2D graphics are used for menus and text in the on-screen display. However, on-screen menus using 3D graphics are required to increase the efficiency of information delivery and to improve various visual effects.

When on-screen menus using 3D graphic images are generated by a general 3D graphics processing system, a 3D graphic on-screen display is generated by using 3D graphic data describing the motion of 3D menus and an additional 3D graphics accelerator for processing the 3D graphic data. However, a 3D graphics accelerator is expensive, so a device such as a DTV or STB, which performs minimal 3D graphics processing, is not usually fitted with a 3D graphics accelerator.

Therefore, a method of sequentially displaying a series of 2D images and video data generated from 3D graphics has been proposed. However, the series of 2D images and the video data comprise a large amount of data, so that the 3D graphics processing system for processing the series of 2D images and the video data also requires a large memory. In addition, it is difficult to simultaneously display the series of 2D images generated from the 3D graphics and 2D graphics on the same display screen.

Accordingly, a method and a system are needed for effectively generating an on-screen display having 3D graphic effects, in the devices without high quality 3D graphics accelerators and without a large memory.

SUMMARY OF THE INVENTION

Aspects of the present invention provide a method and an apparatus for generating a 3D on-screen display capable of constructing a 3D graphic on-screen display system more cheaply than a system with a built-in 3D graphics accelerator.

According to an aspect of the present invention, there is provided a method of generating a 3D graphic on-screen display using 3D graphic data, including: generating a 3D graphic image of a 3D geometric object from the 3D graphic data; mapping the 3D graphic image to a 2D graphic image; and moving the 2D graphic image according to 2D motion of the 3D geometric object.

The mapping may include mapping the 3D graphic images of a plurality of 3D geometric objects obtained from the 3D graphic data to corresponding 2D graphic images.

The moving may include moving a plurality of the 2D graphic images according to 2D motion of a plurality of the 3D geometric objects.

The 2D motion may correspond to at least one of translation, scaling, shearing, and 2D rotation.

The moving may include generating a single 2D graphic image with respect to the 3D geometric object and moving the single 2D graphic image according to the 2D motion of the 3D geometric object.

The moving may include generating a plurality of 2D graphic images with respect to the 3D geometric object and moving the 2D graphic images according to the 2D motion of the 3D geometric object. A plurality of the 2D graphic images may be generated when 3D motion is represented by using 3D rotation or 3D morphing such that the motion cannot be represented by a combination of at least one of translation, scaling, shearing, and 2D rotation.

The 2D motion may be input by a user.

The method may further include estimating the 2D motion from 3D motion of the 3D geometric object obtained from the 3D graphic data.

Another aspect of the present invention provides an apparatus for generating a 3D graphic on-screen display using 3D graphic data, including: a 3D graphic image generator generating a 3D graphic image of a 3D geometric object from the 3D graphic data; a mapping unit for mapping the 3D graphic image to a 2D graphic image; and a motion connecting unit for moving the 2D graphic image according to 2D motion of the 3D geometric object.

The mapping unit may map 3D graphic images of a plurality of 3D geometric objects obtained from the 3D graphic data to corresponding 2D graphic images.

The motion connecting unit may move a plurality of the 2D graphic images according to 2D motion of a plurality of the 3D geometric objects.

The 2D motion may correspond to at least one of translation, scaling, shearing, and 2D rotation.

The motion connecting unit may generate a single graphic image with respect to the 3D geometric object and move the single graphic image according to the 2D motion of the 3D geometric object.

The motion connecting unit may generate a plurality of 2D graphic images with respect to the 3D geometric object and move the graphic images according to the 2D motion of the 3D geometric object. In addition, a plurality of the 2D graphic images may be generated when 3D motion is represented by using 3D rotation or 3D morphing such that the motion cannot be represented by a combination of at least one of translation, scaling, shearing, and 2D rotation.

In addition, the 2D motion may be input by a user.

In addition, the apparatus may further include a 2D motion estimator estimating the 2D motion from 3D motion of the 3D geometric object obtained from the 3D graphic data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
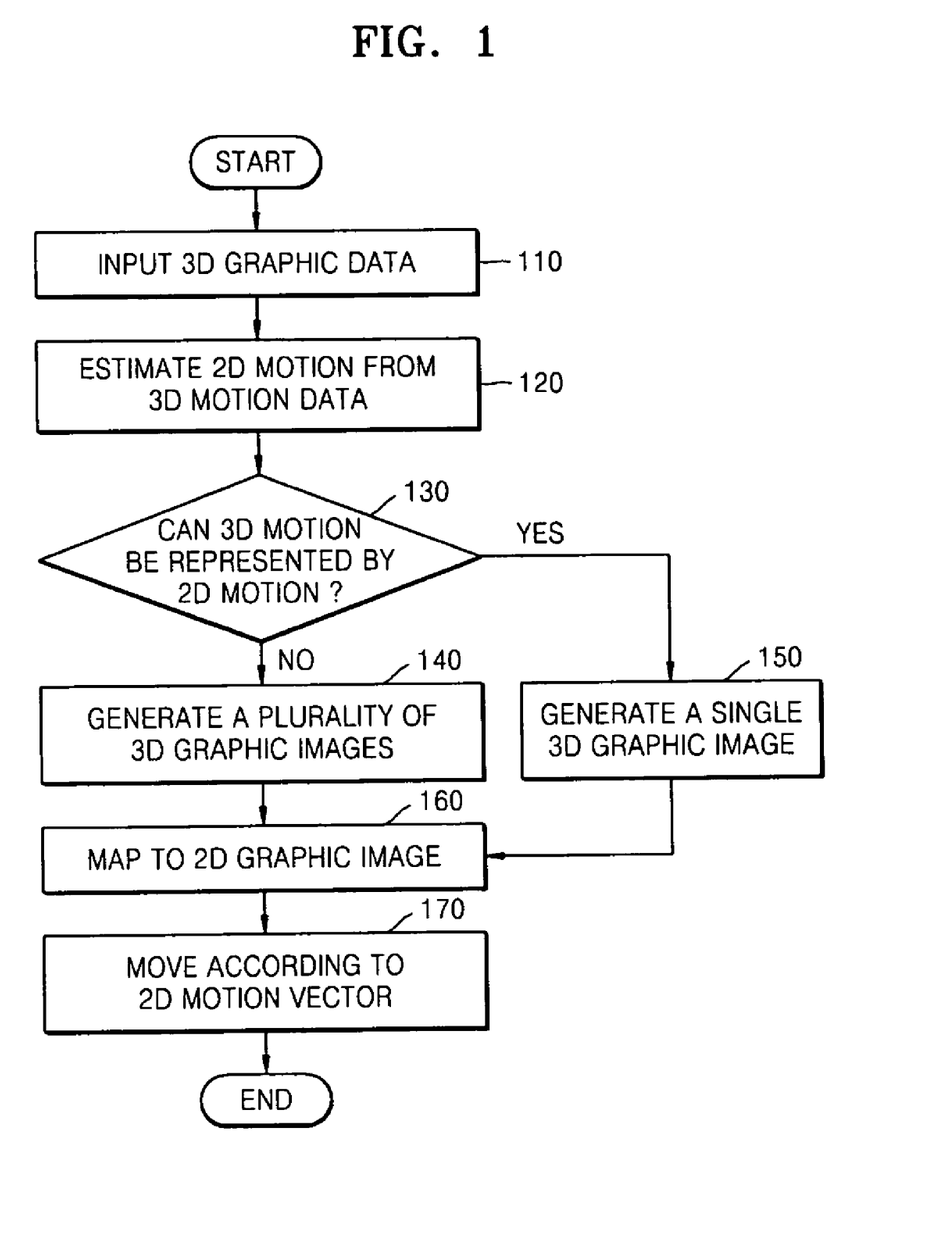
FIG. 1 is a flowchart showing a method of generating a 3D graphic on-screen display according to an exemplary embodiment of the present invention.

The aspects of the present invention will become more apparent by describing in detail exemplary embodiments thereof with reference to the attached drawings, in which:

FIG. 1 is a flowchart showing a method of generating a 3D graphic on-screen display according to an exemplary embodiment of the present invention.

In operation 110, 3D graphic data is input to generate 3D graphic images and to estimate 2D motion.

In operation 120, information regarding 3D motion of a 3D geometric object is obtained from the 3D graphic data, and 2D motion is estimated on a viewport on the basis of the information. The 3D motion includes 3D motion input in advance with respect to the 3D geometric object and 3D motion input by a user to transform and move the 3D geometric object.

In operation 130, it is determined whether or not the 3D motion of the 3D geometric object obtained in operation 120 can be represented by at least one of translation, scaling, shearing, and 2D rotation. In other words, it is determined whether or not the 3D motion can be represented by simple 2D motion based on translation, scaling, shearing, or 2D rotation.

When it is determined that the 3D motion cannot be represented by simple 2D motion, then in operation 140, a series of 3D graphic images showing changes in the 3D geometric object are generated from the 3D graphic data such that the 3D motion can be suitably represented in 2D. Then, in operation 160 a plurality of the 3D graphic images are mapped to corresponding 2D graphic images. Thereafter, in operation 170, the mapped images are sequentially changed and moved according to 2D motion vectors, so that 3D graphic on-screen display is generated.

When it is determined in operation 130 that the 3D motion can be represented by simple 2D motion, a single 3D graphic image is generated from the 3D graphic data in operation 150. Then, in operation 160, the generated image is mapped to a corresponding 2D graphic image, and the mapped image is moved according to the 2D motion vectors, so that a 3D graphic on-screen display is generated in operation 170.

The plurality of 3D graphic images may be generated in instances other than when the 3D motion of the 3D geometric object cannot be represented by at least one of translation, scaling, shearing, and 2D rotation. Consistent with another exemplary embodiment of the present invention, even when the 3D motion can be represented by at least one of translation, scaling, shearing, and 2D rotation, a plurality of 3D graphic images may also be generated to be mapped to corresponding 2D graphic images, and the mapped images may then be moved according to the 2D motion vectors.

When the 3D graphic data includes information regarding a plurality of 3D geometric objects, each of the 3D geometric objects is subjected to operations 120, 130, 140, 150, 160 and 170. Therefore, the plurality of 3D geometric objects can be displayed on one screen.

Figure 2:
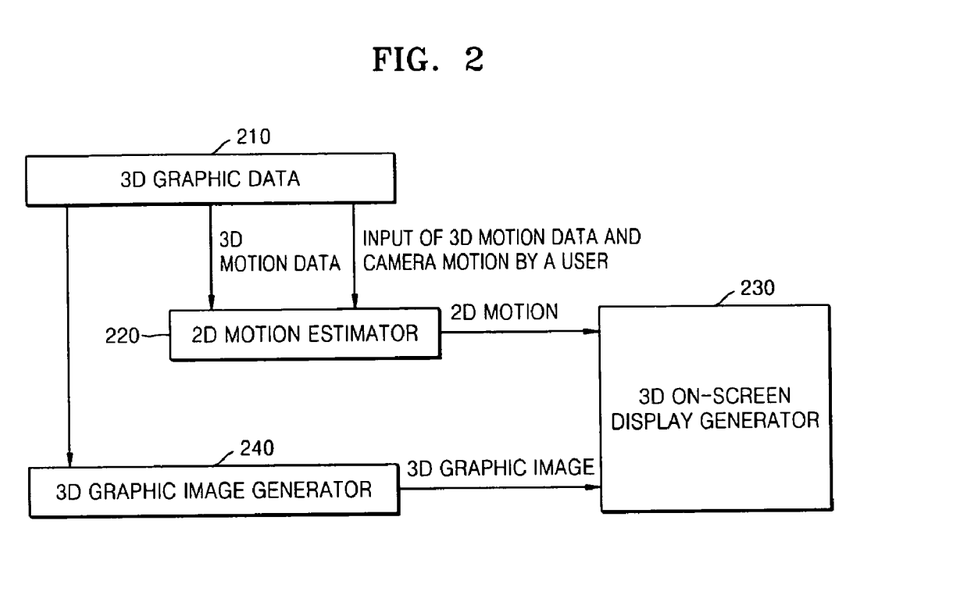
FIG. 2 is a block diagram of a system for generating a 3D graphic on-screen display according to an exemplary embodiment of the present invention.

FIG. 2 is a block diagram of a system for generating a 3D graphic on-screen display according to an exemplary embodiment of the present invention. As shown in FIG. 2, the system for generating a 3D graphic on-screen display according to an exemplary embodiment of the present invention includes a 3D graphic image generator 240 for generating 3D graphic images from 3D graphic data 210, a 2D motion estimator 220 for estimating motion of 3D geometric objects on a 2D viewport from 3D motion data included in the 3D graphic data 210, and a 3D graphic on-screen display generator 230 for receiving the 3D graphic images and 2D motion thereof and for generating the 3D graphic on-screen display.

The 3D graphic image generator 240 receives data with respect to a 3D geometric object from the 3D graphic data 210 and generates a 3D graphic image. The 3D graphic data 210 may include data regarding various forms of 3D geometric objects such as 3D banners, 3D letters, 3D logos, and 3D menu buttons. When information regarding a plurality of 3D geometric objects is included in the 3D graphic data 210, a plurality of 3D graphic images corresponding to the plurality of 3D geometric objects are generated. The method of generating the 3D graphic images is not limited by the exemplary description above, and any method of receiving the 3D graphic data and transforming the data into the 3D graphic images may be employed by the present invention.

The 2D motion estimator 220 estimates 2D motion of the 3D geometric object on the viewport from 3D motion of the 3D geometric object included in the 3D graphic data 210. The 3D motion includes 3D motion input in advance with respect to the motion of the 3D geometric objects, 3D motion of geometric objects and camera motion input by a user to transform and move the 3D geometric objects. The 3D motion of the 3D geometric objects is projected on a 2D plane to calculate 2D motion.

FIGS. 3A, 3B, 3C and 3D show motion estimation performed by the 2D motion estimator 220 for estimating 2D motion from 3D motion data of the 3D graphic data.

Figure 3A:
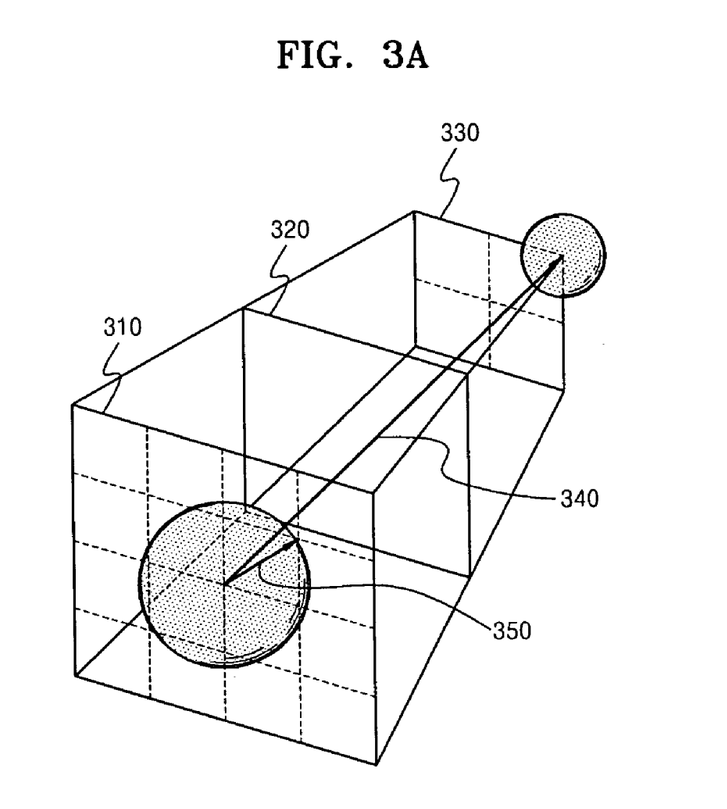
FIGS. 3A, 3B, 3C and 3D show operations performed by a 2D motion estimator according to an exemplary embodiment of the present invention.

FIG. 3A shows an example of motion estimation where a sphere at the center of a plane 310 is moved to a plane 330 by a user. It is assumed that the radius of the sphere is 1, each of the planes 310, 320, and 330 has a size of 4×4 in an X×Y plane, that the distance between the two planes 310 and 320 is 1 in a z-axis direction, and that the distance between the two planes 320 and 330 is 1 in a z-axis direction.

First, a vector associated with the translation of the sphere is obtained as follows. When the center of the sphere is moved from the plane 310 to the plane 330 along the X-axis, Y-axis, and Z-axis, the motion of the sphere is represented by a 3D motion vector 340: (dx, dy, dz)=(2, 2, 2). Therefore, the sphere is projected on the plane 310 by using a 2D motion vector 350, and the 2D motion vector 350 is represented by (dx, dy)=(1, 1).

Next, a vector associated with the scaling is obtained as follows. The sphere moved to the plane 330 is shown as having a radius of 0.5, reduced by half of the original radius, when projected on the plane 310. Therefore, the scaling vector is represented by (sx, sy)=(0.5, 0.5).

Figure 3B:
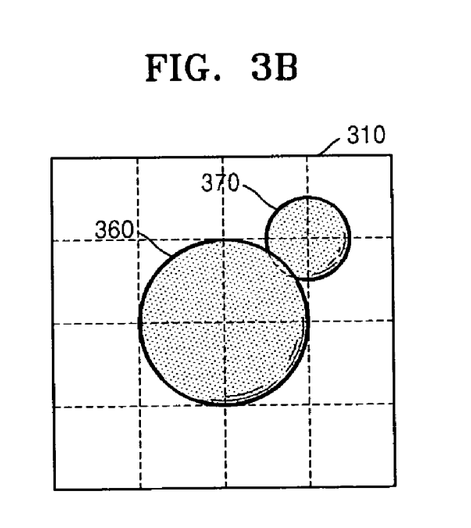
Figure 3C:
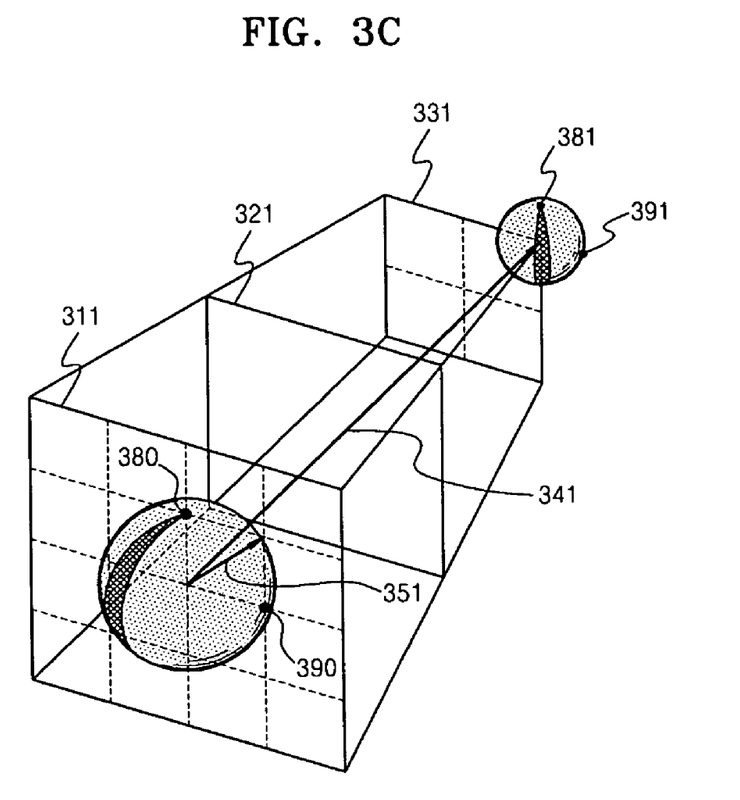

As shown in FIG. 3B, when all the 2D graphic images are displayed on the plane 310, the 3D motion of the sphere 360 results in a sphere 370 in the plane 310.

The 3D motion of the 3D geometric objects may include motion represented by 3D rotation, so that the motion cannot be represented by 2D motion generated by translation, scaling, or the like. In this case, motion vectors of the motion on the 2D plane are calculated based on representative points of the 3D geometric object, such as an endpoint 380 of the sphere on the Y-axis shown in FIG. 3C and an endpoint 390 of the sphere on the X-axis.

Figure 3D:
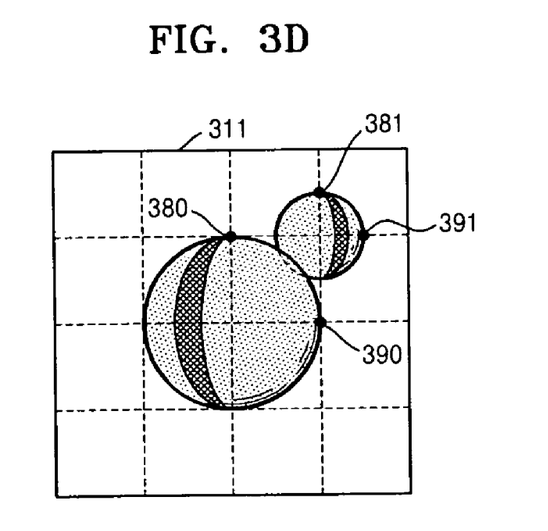

As shown in FIG. 3D, the translation of the sphere in the 2D plane 311 is the same as the movement in the 2D plane 310 of FIG. 3A, and a scaling vector is also the same as the movement in the 2D plane of FIG. 3A. In other words, the distance between the point 381 and the point 391 is reduced by half of the distance between the point 380 and the point 390. However, as shown in FIG. 3D, there is a problem in that the 2D graphic image in the plane 311 is changed. To solve this problem, several images are generated and sequentially changed and moved using the 2D motion vectors as shown in FIG. 4D. These operations will now be described in detail.

FIGS. 4A, 4B, 4C and 4D show 3D motion of 3D geometric objects and 3D graphic images generated by the 3D graphic image generator 240 according to the 3D motion of 3D geometric objects.

Figure 4A:
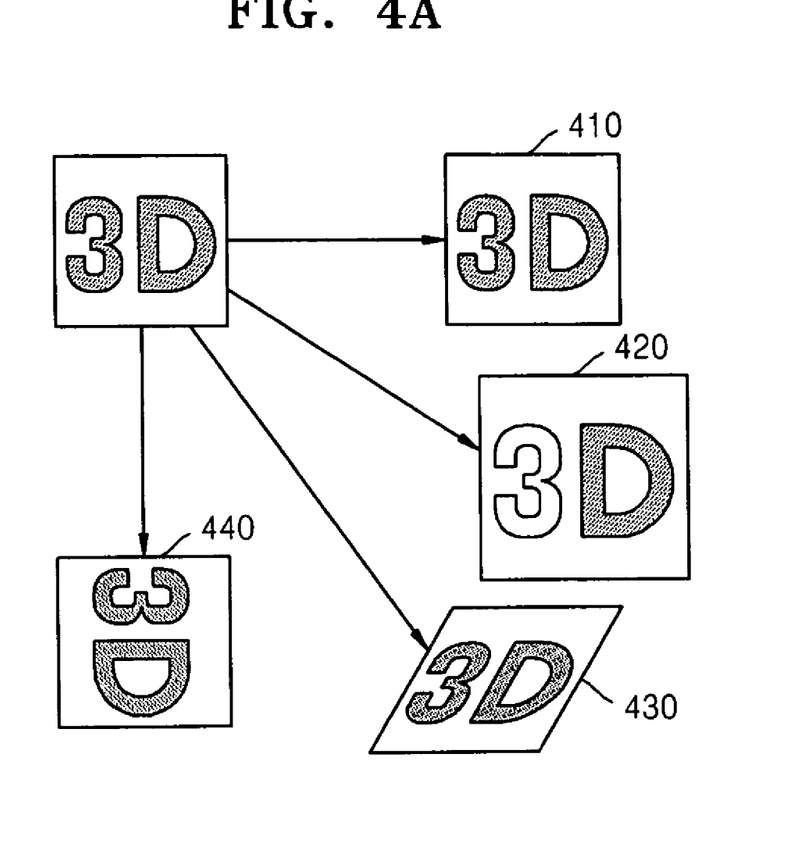
FIGS. 4A, 4B, 4C and 4D show 3D motion of a 3D geometric object and 3D graphic images generated by a 3D graphic image generator according to the 3D motion of the 3D geometric object, consistent with an exemplary embodiment of the present invention.

As shown in FIG. 4A, the translation 410 corresponds to the movement of the 3D geometric object. The scaling 420 corresponds to a change in size. The shearing 430 corresponds to tilting the 3D geometric object in the 2D plane. The 2D rotation 440 corresponds to a rotation of the 3D geometric object, which can be represented in the 2D plane and does not involve 3D motion.

Figure 4B:
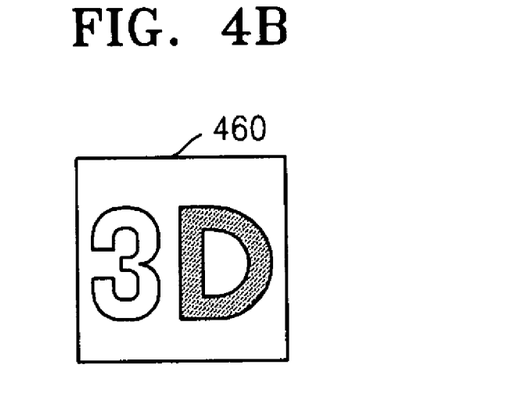

When the 3D motion of the 3D geometric object obtained by analyzing 3D motion data using the 2D motion estimator 220 corresponds to at least one of translation 410, scaling 420, shearing 430, and 2D rotation 440, then a single 3D graphic image 460 is generated by the 3D graphic image generator 240 as shown in FIG. 4B.

Figure 4C:
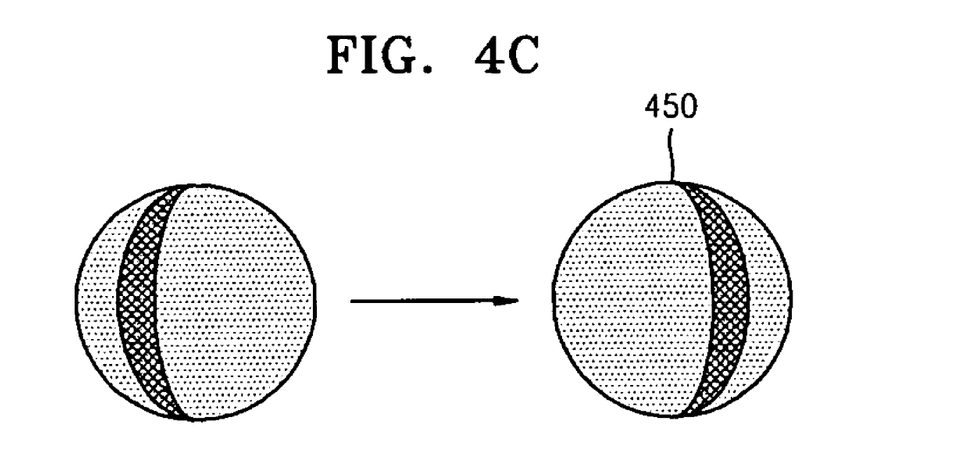
Figure 4D:
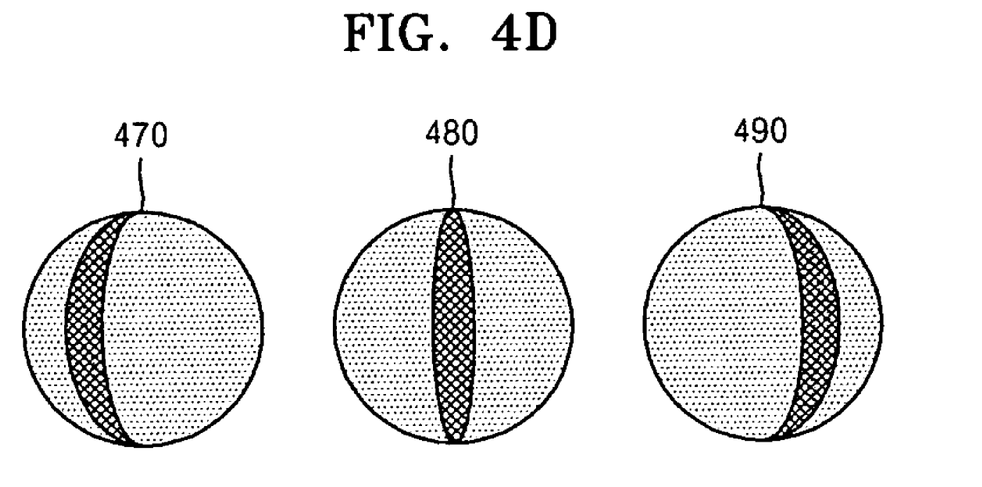

On the other hand, the 3D motion may be generated by using 3D rotation 450, as shown in FIG. 4C, or 3D morphing (not shown). In that case, the motion cannot be represented by the aforementioned motion, or any combination thereof, and a series of a plurality of 3D graphic images 470, 480 and 490 which can represent the motion of the 3D geometric object are generated by the 3D graphic image generator 240, as shown in FIG. 4D.

In addition, according to an exemplary embodiment of the present invention, even when the 3D motion of the 3D geometric object corresponds to at least one of translation, scaling, shearing, and 2D rotation as described above, the plurality of 3D graphic images may also be generated.

Figure 5:
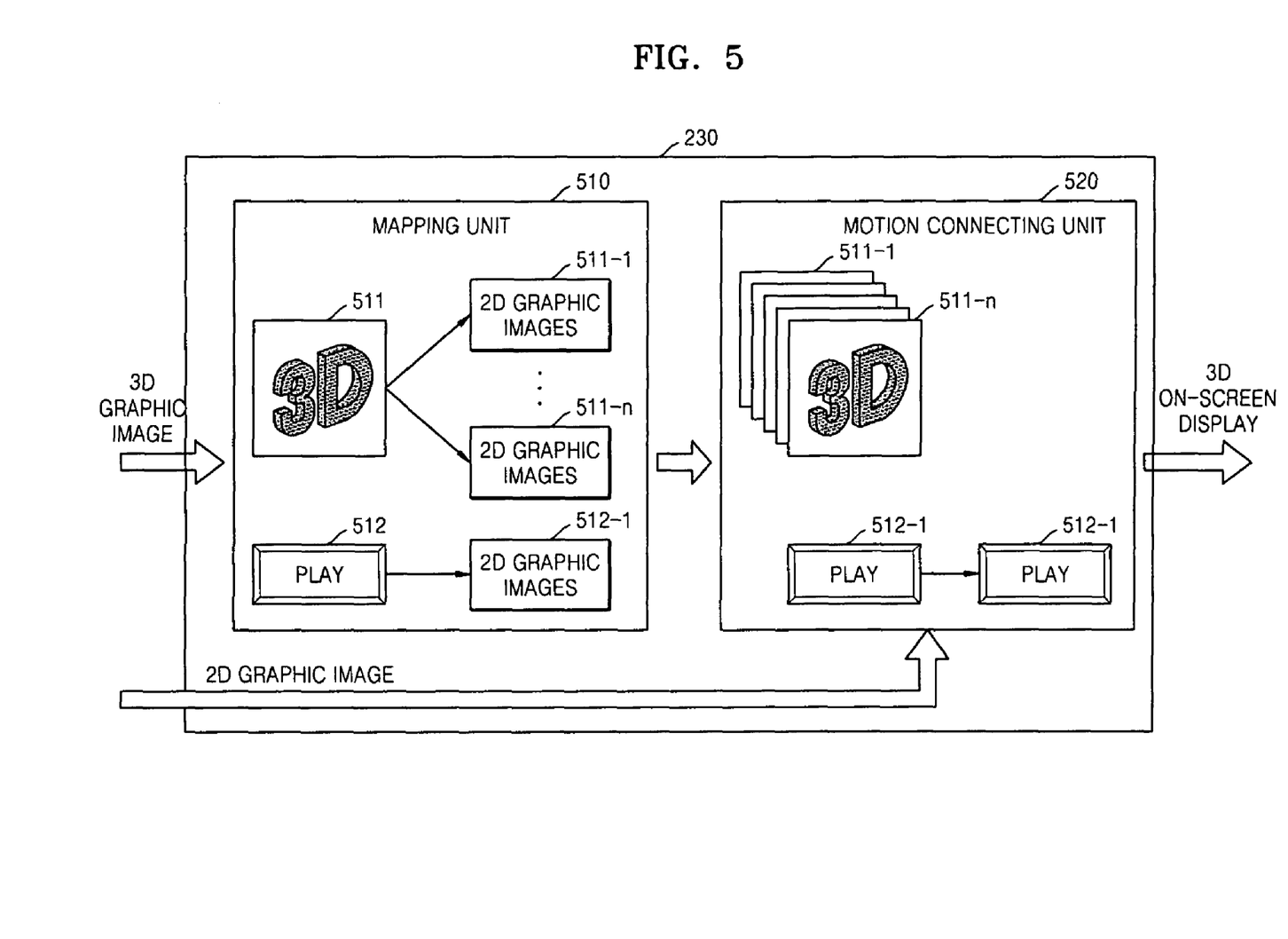
FIG. 5 shows a 3D graphic on-screen display generator according to an exemplary embodiment of the present invention.

FIG. 5 shows the 3D graphic on-screen display generator 230, consistent with an exemplary embodiment of the present invention.

The 3D graphic on-screen display generator 230 includes a mapping unit 510 for mapping the 3D graphic images generated by the 3D graphic image generator to 2D graphic images, and a motion connecting unit 520 for moving the 2D graphic images according to the 2D motion estimated by the 2D motion estimator 220.

The mapping unit 510 has a function of mapping the 3D graphic image 512, which is generated by the 3D graphic image generator 240, to a 2D graphic image 512-1 having a polygonal shape enclosing the 3D geometric object.

When the plurality of 3D graphic images are generated for a single 3D geometric object 511, the 3D graphic images are mapped to corresponding 2D graphic images 511-1 to 511-n.

When the 3D graphic data includes graphic data with respect to the plurality of 3D geometric objects 511 or 512, the plurality of 3D graphic images obtained from the plurality of 3D geometric objects are mapped to the corresponding 2D graphic images 511-1 to 511-n, and 512-1.

The mapped 2D graphic images are moved by the motion connecting unit 520 according to the 2D motion estimated by the 2D motion estimator 220.

FIGS. 6A, 6B, 6C and 6D show operations performed by the motion connecting unit 520, according to an exemplary embodiment of the present invention.

Figure 6A:
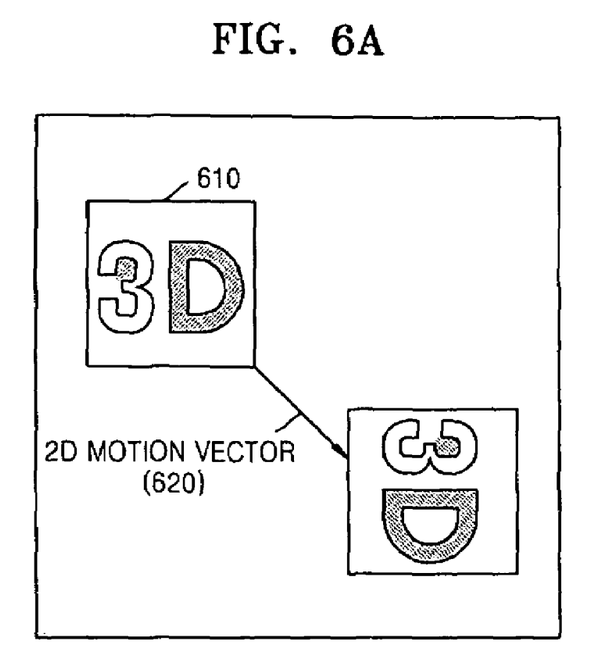
FIGS. 6A and 6B show operations performed on 2D graphic images according to an exemplary embodiment of the present invention.

FIG. 6A shows a 3D geometric object which is subject to translation 410 and 2D rotation 440. The motion shown in FIG. 4A can be used for a combination of translation 410 and 2D rotation 440. Therefore, a single 3D graphic image 460 is generated by the 3D graphic image generator 240 and mapped to the 2D graphic image by the mapping unit 510. The mapped 2D graphic image 610 is moved according to the 2D motion vector 620 and is two-dimensionally rotated by an angle of 90 degrees clockwise, thereby generating the on-screen display having 3D graphic effects. When the plurality of 3D graphic images are generated even though the 3D geometric object is subject to a combination of translation and 2D rotation, the generated images are changed and moved according to the 2D motion vectors 620.

Figure 6B:
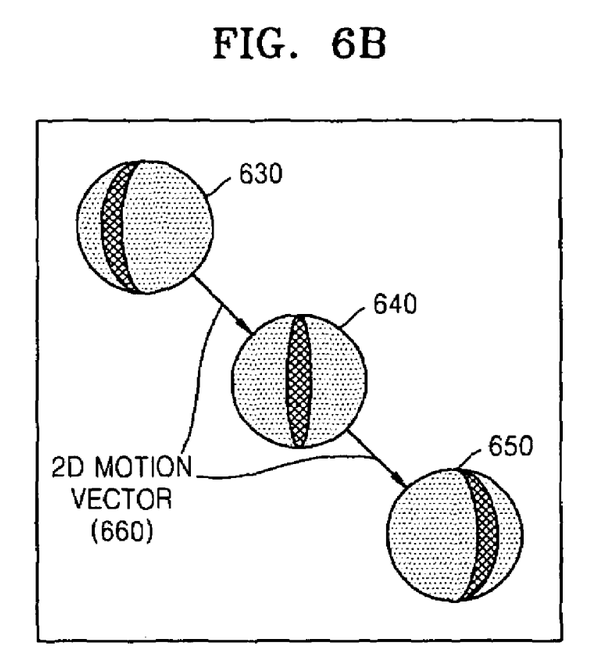

FIG. 6B shows a 3D geometric object which is subject to translation 410 and 3D rotation 450. The motion shown in FIG. 4A cannot be used for a combination of translation 410 and 3D rotation 450. Therefore, a series of a plurality of 3D graphic images 470, 480 and 490 capable of suitably representing the motion of the 3D geometric object are generated by the 3D graphic image generator 240, and mapped to corresponding 2D graphic images by the mapping unit 510. The mapped images 630, 640 and 650 are sequentially changed and moved to be displayed according to the 2D motion vector 660, thereby generating an on-screen display having 3D graphic effects.

The 2D motion vector 660 is obtained by projecting the 3D motion data to which 3D motion of the 3D geometric objects are allocated in advance and 3D motion input by a user with respect to the 3D geometric objects into a viewport on a plane. The user can input the 3D motion such as movement, translation and scaling for the 3D geometric objects, and can transform the 3D geometric objects according to the 3D motion. Accordingly, a user interface can be provided.

As described above with reference to the 3D graphic image generator 240 and the mapping unit 510, when the on-screen display is generated with respect to a plurality of 3D geometric objects, the 2D graphic images corresponding to the 3D geometric objects are moved according to the associated 2D motion vector. Therefore, a 3D graphic on-screen display is generated.

According to exemplary methods and systems for generating a 3D graphic on-screen display consistent with the present invention, a system for generating an on-screen display using 3D graphics in devices having a low quality processing unit and a small memory can be constructed more cheaply than a system with a built-in 3D graphics accelerator.

In addition, unlike the conventional method of using 3D graphic data, objects in which 3D graphic images are mapped can be scaled and moved by a user, so that various user interfaces can be provided.

While the present invention have been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in an illustrative sense only, and not for purposes of limitation. Therefore, the scope of the invention is defined not by the detailed description of the exemplary embodiments of the present invention but by the appended claims.

Aspects of the present invention can also be embodied as computer readable code on a computer readable recording medium. A computer readable recording medium refers to any data storage device that can store data which can be thereafter read by a computer system. Examples of such a computer readable recording medium include, but are not limited to, read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

What is claimed is:

1. A method of generating a 3D graphic on-screen display using 3D graphic data, the method comprising:
    generating, by a 3D graphic image generator, a 3D graphic image of a 3D geometric object from the 3D graphic data;
    mapping the 3D graphic image to a 2D graphic image; and
    moving the 2D graphic image in accordance with 2D motion of the 3D geometric object.

2. The method of claim 1, further comprising mapping 3D graphic images of a plurality of 3D geometric objects obtained from the 3D graphic data to corresponding 2D graphic images.

3. The method of claim 2, further comprising moving a plurality of the 2D graphic images in accordance with 2D motion of a plurality of the 3D geometric objects.

4. The method of claim 1, wherein the 2D motion of the 3D geometric object corresponds to at least one of translation, scaling, shearing, and 2D rotation.

5. The method of claim 4, wherein a single 2D graphic image is generated with respect to the 3D geometric object, and
    wherein the moving the 2D graphic image comprises moving the single 2D graphic image according to the 2D motion of the 3D geometric object.

6. The method of claim 1, wherein a plurality of 2D graphic images are generated with respect to the 3D geometric object, and
    wherein the method further comprises moving the 2D graphic images according to the 2D motion of the 3D geometric object.

7. The method of claim 1, wherein data regarding the 2D motion of the 3D geometric object is input by a user.

8. The method of claim 1, further comprising estimating the 2D motion of the 3D geometric object from 3D motion of the 3D geometric object obtained from the 3D graphic data.

9. The method of claim 1, wherein the 2D motion corresponds to 2D motion vectors.

10. An apparatus for generating a 3D graphic on-screen display using 3D graphic data, the apparatus comprising:
    a 3D graphic image generator, comprising a processing device, which generates a 3D graphic image of a 3D geometric object from the 3D graphic data;
    a mapping unit, which maps the 3D graphic image to a 2D graphic image; and
    a motion connecting unit, which moves the 2D graphic image in accordance with 2D motion of the 3D geometric object.

11. The apparatus of claim 10, wherein the mapping unit maps 3D graphic images of a plurality of 3D geometric objects obtained from the 3D graphic data to corresponding 2D graphic images.

12. The apparatus of claim 11, wherein the motion connecting unit moves a plurality of the 2D graphic images in accordance with 2D motion of a plurality of the 3D geometric objects.

13. The apparatus of claim 10, wherein the 2D motion of the 3D geometric object corresponds to at least one of translation, scaling, shearing, and 2D rotation.

14. The apparatus of claim 13, wherein the motion connecting unit generates a single graphic image with respect to the 3D geometric object and moves the single graphic image in accordance with the 2D motion of the 3D geometric object.

15. The apparatus of claim 10, wherein the motion connecting unit generates a plurality of 2D graphic images with respect to the 3D geometric object and moves the plurality of 2D graphic images according to the 2D motion of the 3D geometric object.

16. The apparatus of claim 10, wherein data regarding the 2D motion of the 3D geometric object is input by a user.

17. The apparatus of claim 10, further comprising a 2D motion estimator, which estimates the 2D motion of the 3D geometric object from 3D motion of the 3D geometric object obtained from the 3D graphic data.

18. The apparatus of claim 10, wherein the 2D motion corresponds to 2D motion vectors.

* * * * *